(12) United States Patent
Jaworowski

(10) Patent No.: US 7,399,389 B2
(45) Date of Patent: Jul. 15, 2008

(54) CORROSION INHIBITOR DISPENSING APPARATUS AND METHODS

(75) Inventor: Mark R. Jaworowski, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 377 days.

(21) Appl. No.: 11/171,765

(22) Filed: Jun. 29, 2005

(65) Prior Publication Data

US 2007/0000560 A1  Jan. 4, 2007

(51) Int. Cl.
*C23F 13/06* (2006.01)
(52) U.S. Cl. .......................... 204/196.15; 204/196.12; 204/196.13; 422/256; 422/266; 422/276; 422/277; 422/281
(58) Field of Classification Search ............ 204/196.12, 204/196.13, 196.15; 422/256, 266, 276, 422/277, 281
See application file for complete search history.

(56) References Cited

U.S. PATENT DOCUMENTS 6,537,678 B1 * 3/2003 Putnam et al. .............. 428/469
6,825,040 B2 * 11/2004 Scaringe et al. .............. 436/39
2004/0001985 A1    1/2004 Alva
2004/0262580 A1   12/2004 Yu et al.
2005/0019236 A1 * 1/2005 Martin et al. ................ 422/255
2005/0103701 A1    5/2005 Bechtum et al.

FOREIGN PATENT DOCUMENTS

| EP | 0285318 A1 | 10/1988 |
| EP | 0349893 A1 | 1/1990 |
| JP | 6093479 A | 4/1994 |
| WO | 9610543 A | 4/1996 |
| WO | WO 2004/106246 A3 | 12/2004 |

OTHER PUBLICATIONS

European Search Report for EP Patent Application No. 06253420.1, no month/year available.

* cited by examiner

*Primary Examiner*—Bruce F. Bell
(74) *Attorney, Agent, or Firm*—Bachman & LaPointe, P.C.

(57) ABSTRACT

A corrosion inhibitor dispensing apparatus has a housing with a fluid inlet and a fluid outlet. A first body within the housing comprises a cathodic corrosion inhibitor. A second body within the housing comprises an anodic corrosion inhibitor.

25 Claims, 4 Drawing Sheets

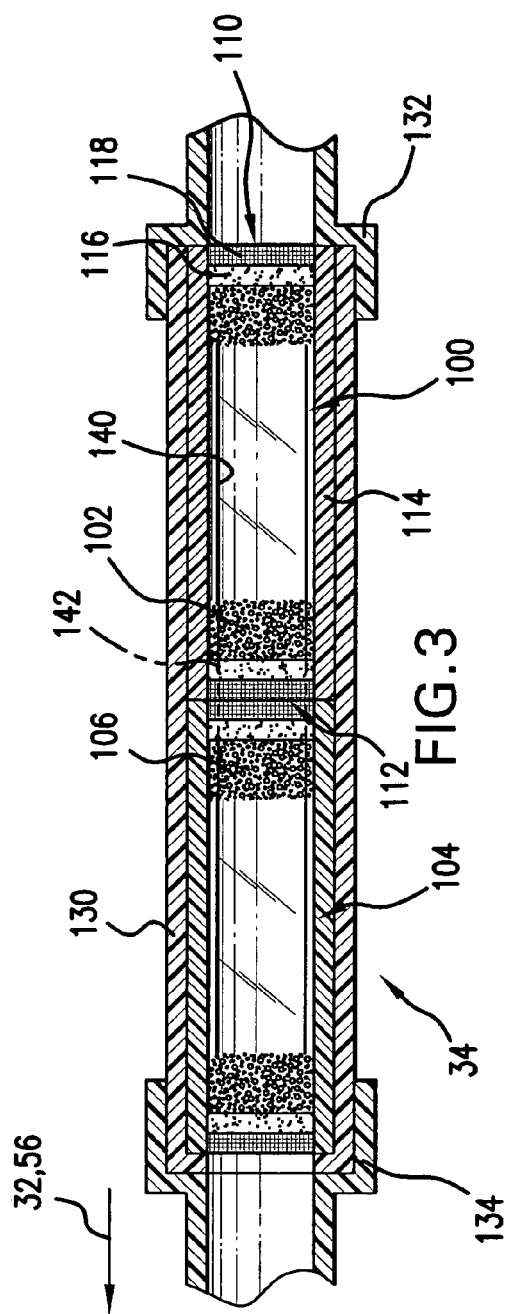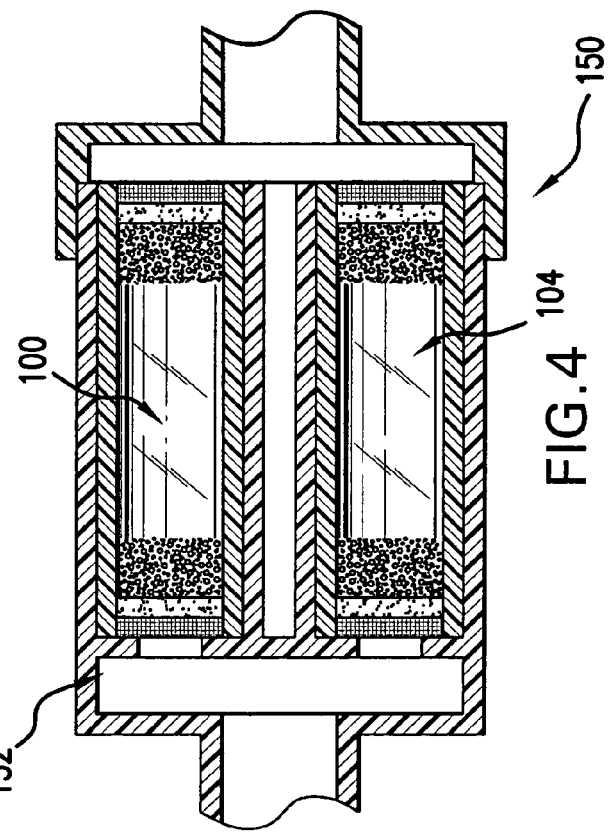

CORROSION INHIBITOR DISPENSING APPARATUS AND METHODS

BACKGROUND OF THE INVENTION

The invention relates to corrosion inhibiting additives. More particularly, the invention relates to dispensing anodic/cathodic inhibitor combinations.

U.S. Pat. No. 6,537,678-B1 and US pre-grant publication 20040262580-A1 disclose the use of combinations of cathodic corrosion inhibitors and anodic corrosion inhibitors. Other forms of corrosion inhibitors are also known. WO2004106246-A2 discloses inhibitors and a number of dispensing devices for water systems. US pre-grant publication 20050019236-A1 discloses devices for introducing additives to lubrication systems.

SUMMARY OF THE INVENTION

One aspect of the invention involves a corrosion inhibitor dispensing apparatus. The apparatus has a housing having a fluid inlet and a fluid outlet. A first body of cathodic corrosion inhibitor is within the housing. A second body of anodic corrosion inhibitor is within the housing.

In various implementations, the first body may further include a metal complexing agent for increasing solubility of at least one of the anodic corrosion inhibitor and cathodic corrosion inhibitor. The housing may include a main housing and at least one cartridge body within the main housing. The at least one cartridge body may, in turn, contain the first body and the second body. The at least one cartridge body may include a first cartridge body and a second cartridge body in series or parallel.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 3 is a longitudinal sectional view of a first corrosion inhibitor dispensing apparatus.

FIG. 4 is a longitudinal sectional view of a second corrosion inhibitor dispensing apparatus.

Like reference numbers and designations in the various drawings indicate like elements.

DETAILED DESCRIPTION

Figure 1:
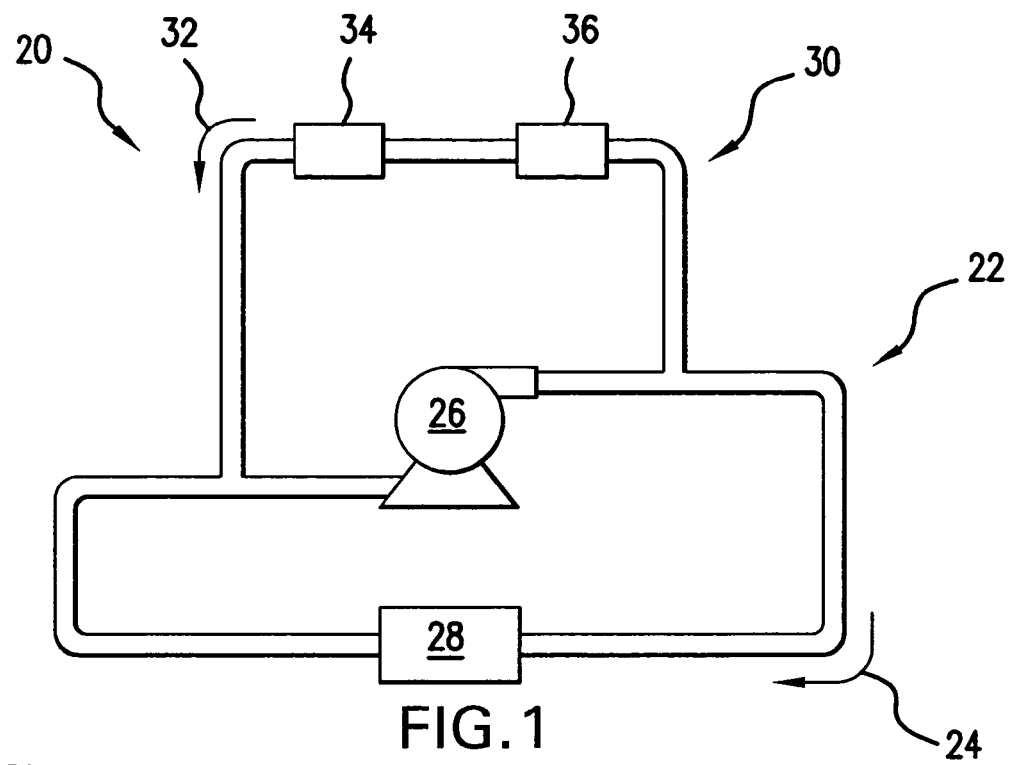
FIG. 1 is a schematic view of a first recirculating system with a corrosion inhibitor dispensing apparatus.

FIG. 1 shows recirculating fluid system 20 including a main flowpath or loop 22. Fluid is driven along the flowpath 22 in a downstream direction 24 by means of a pump 26. One or more components 28 are positioned along the flowpath 22. Examples of such main flowpaths 22 are machining coolant, hydraulic fluid and heat exchanger circulation loops.

FIG. 1 further shows a secondary loop/flowpath 30 partially overlapping the main flowpath 22. Fluid moves along the flowpath 30 in a downstream direction 32 driven by the pump 26. In an exemplary implementation, the flowpath 30 branches from the flowpath 22 immediately downstream of the outlet of the pump 26 and returns immediately upstream of the inlet. A portion of the flow from the pump (e.g., a minor portion) is diverted from the main flowpath 22 to the secondary flowpath 30. Along the flowpath 30, the secondary flow passes through a dispensing apparatus 34. The secondary flow may also pass through a filter 36 and/or other components (e.g., a separator for removing non-filterable impurities such as chemical impurities (e.g., water from a non-aqueous fluid) or phase impurities (e.g., dissolved gases)). A restrictor (not shown) in the secondary flowpath 30 may be selected to provide a desired flow rate in the secondary flowpath 30.

Figure 2:
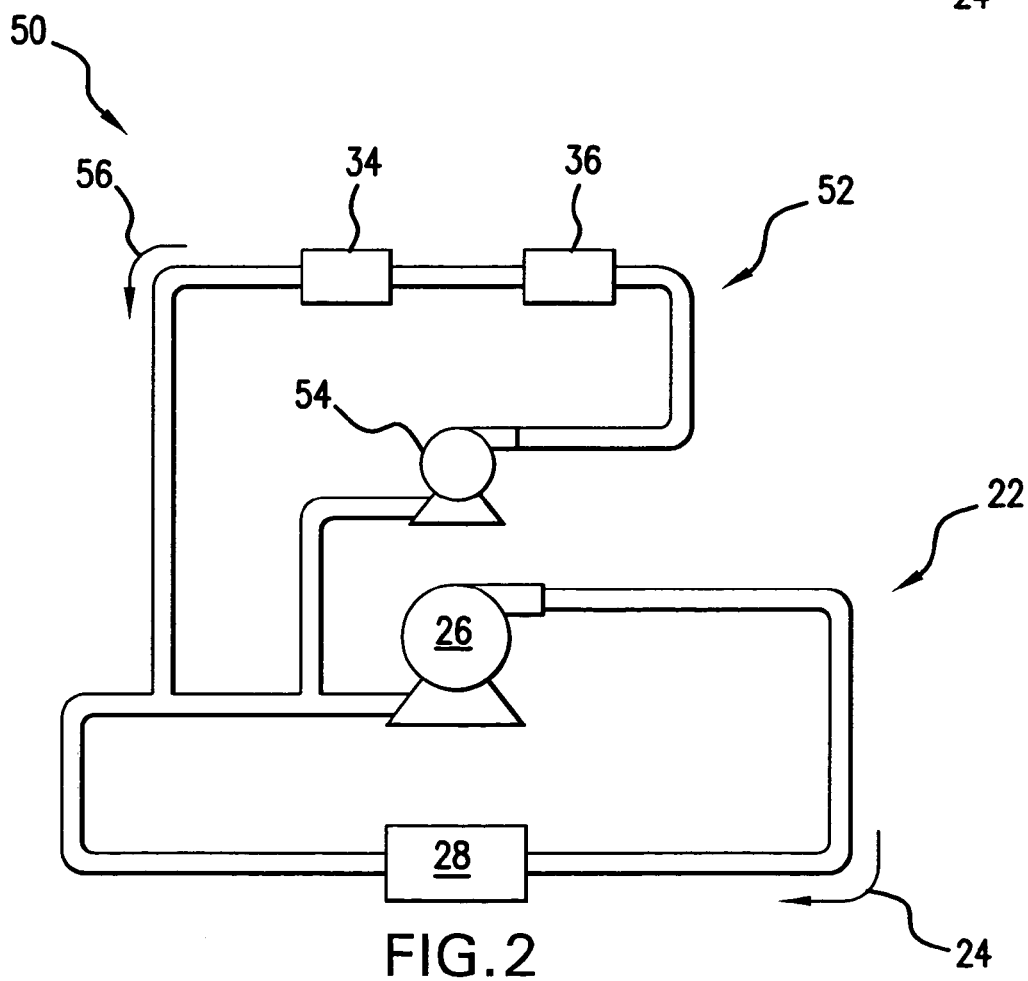
FIG. 2 is a schematic view of a second recirculating fluid system with a corrosion inhibitor dispensing apparatus.

FIG. 2 shows an alternate system 50 wherein the secondary flowpath 52 does not span the pump 26 but, instead, includes its own pump 54 driving a secondary flow along the secondary flowpath in a downstream direction 56. Yet other implementations of a secondary flowpath could lack a separate pump but span a restrictor in the main flowpath.

FIG. 3 shows one exemplary implementation of the dispensing apparatus 34. The apparatus includes a first cartridge 100 containing a reactive medium 102. An exemplary reactive medium or bed 102 serves as the cathodic corrosion inhibitor and a complexing agent. Exemplary cathodic corrosion inhibitors and complexing agents are disclosed in the '580 publication, the disclosure of which is incorporated by reference herein as if set forth at length. These two components may be combined into a single medium by pre-reaction to form an organo-metallic complex, followed by sizing (such as through wet or dry grinding). Alternatively, they may be combined by pre-reaction to form the organo-metallic complex followed by consolidation into beads or other pellet media through the use of organic or inorganic binders. One exemplary cathodic corrosion inhibitor is cerous citrate.

Downstream of the cartridge 100, a second cartridge 104 contains a second medium 106. The second medium may serve as an anodic corrosion inhibitor. Exemplary anodic corrosion inhibitors are disclosed in the '580 publication. Exemplary anodic corrosion inhibitors are zinc molybdate, strontium tungstate, and combinations thereof (e.g., a 1:1 by weight blend). The second medium may have a similar physical form as the first medium. In general, this medium may be formed as powders, agglomerated powders, beads, fibers, perforated or reticulated plates, blocks, and the like.

Each exemplary cartridge 100 and 102 extends from an upstream end 110 to a downstream end 112. An annular body 114 extends between such ends. In the exemplary implementation, the cartridges are symmetric from end-to-end, permitting bidirectional reversal. Alternative unidirectional cartridges are possible. Unidirectional cartridges would advantageously include directional indicia to promote installation in the correct orientation. Alternatively, unidirectional cartridges and the associated dispenser housing could include keying features to insure proper orientation.

In each end portion of the bodies 114, there may be one or more elements 116 and/or 118 such as screens, perforated plate filters, and the like. These elements 116 and/or 118 may serve to retain the medium 102 or 106 in the body 114. The elements 116 and/or 118 may serve other functions. Exemplary other functions include serving as chemical indicators. An exemplary indicator function is to indicate the local pH. For example, the element 116 may provide a calorimetric indication of pH. This may be achieved by doping a fibrous or reticulate material with a pH indicator or depositing a pH indicator on such a material or on a loose material held between screens or the like.

In the exemplary implementation, the two cartridges 100 and 104 are positioned end-to-end inserted within a body portion 130 (e.g., a tube) of the dispenser 34. At respective upstream and downstream ends of the body 130, fittings 132 and 134 may connect the dispenser to the adjacent conduit portions of the secondary flowpath. The cartridges may be installed (and then removed and replaced) through one or both ends of the body. Alternative implementations might provide a transverse installation.

In the exemplary implementation, each of the cartridge bodies 114 includes an associated window 140 or other transparent portion which is aligned with one or more corresponding windows 142 (or other transparent portions) of the dispenser body 130. These transparent portions permit a user to view the condition of the media 102 and 106 (e.g., to determine a level of depletion so that the user may replace the cartridges at an appropriate time). As noted above, the dispenser body may contain a pH-sensitive indicator (e.g., a single calorimetric indicator) that may be viewed through the transparent portion(s) to confirm that the corrosion inhibiting component is being dispensed. The preferred cathodic inhibitor may produce slightly acidic conditions. The preferred anodic inhibitor may produce slightly alkaline conditions. Two pH-sensitive colorimetric indicators may be used, arranged upstream and downstream of the corrosion inhibitor bed(s), to provide a further indication of the incoming and outlet fluid condition and the adjustment delivered by the dispenser. Advantageously, pH indicators are positioned to provide indications of pH at both the dispenser inlet and outlet.

FIG. 4 shows a dispenser 150 wherein the first and second cartridges 100 and 104 are held in a dispenser body 152 fluidically coupled in parallel rather than series.

Figure 5:
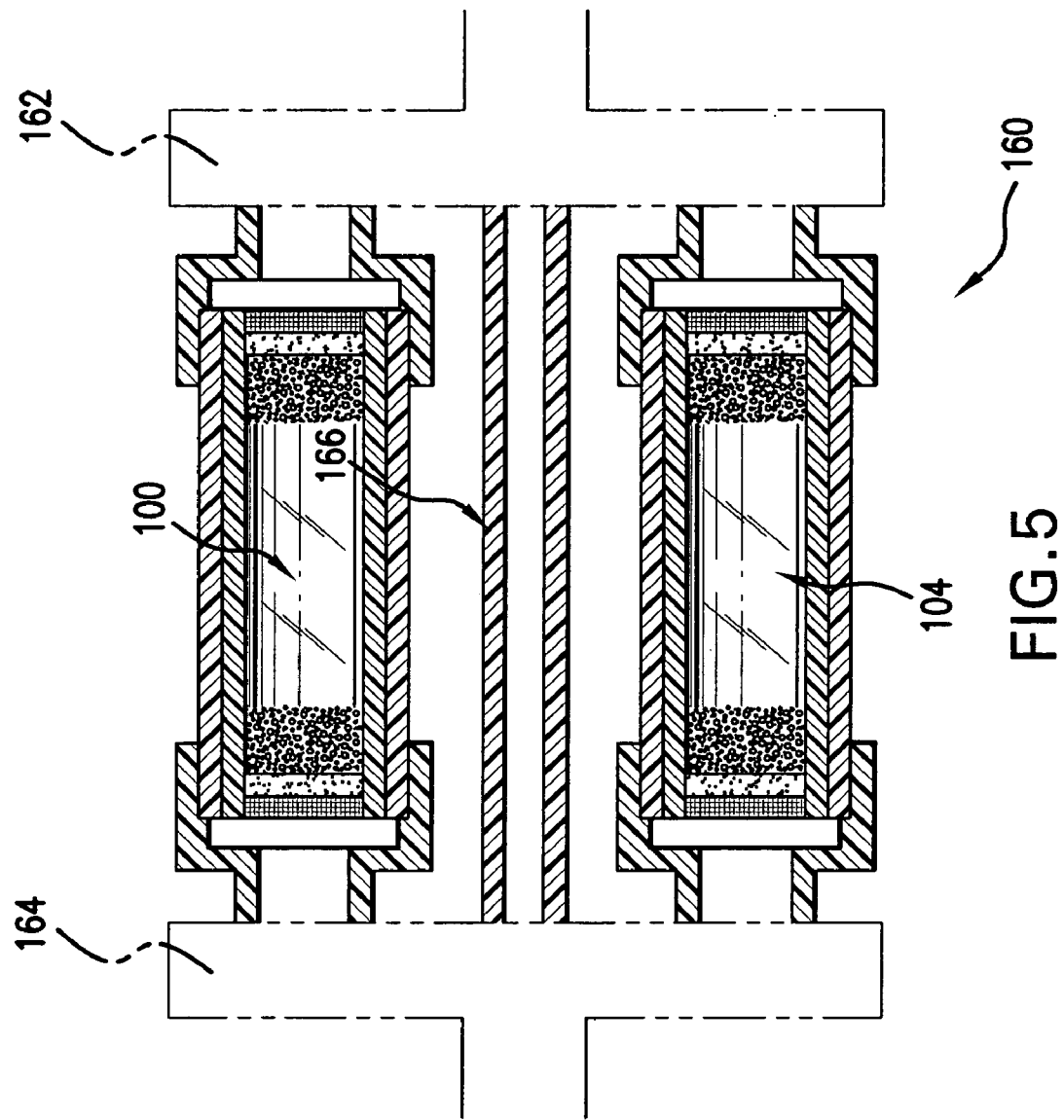
FIG. 5 is a longitudinal sectional view of a third corrosion inhibitor dispensing apparatus.

FIG. 5 shows a dispenser 160 wherein the cartridges 100 and 104 are coupled in parallel between manifolds 162 and 164. A bypass conduit 166 also extends between the manifolds. The bypass conduit may serve several functions. In some implementations, the bypass conduit may serve as a relief path to carry flow as the cartridges plug up. In other implementations, the bypass conduit may carry a major portion of the flow as might be appropriate when installed directly in a primary flowpath.

Figure 6:
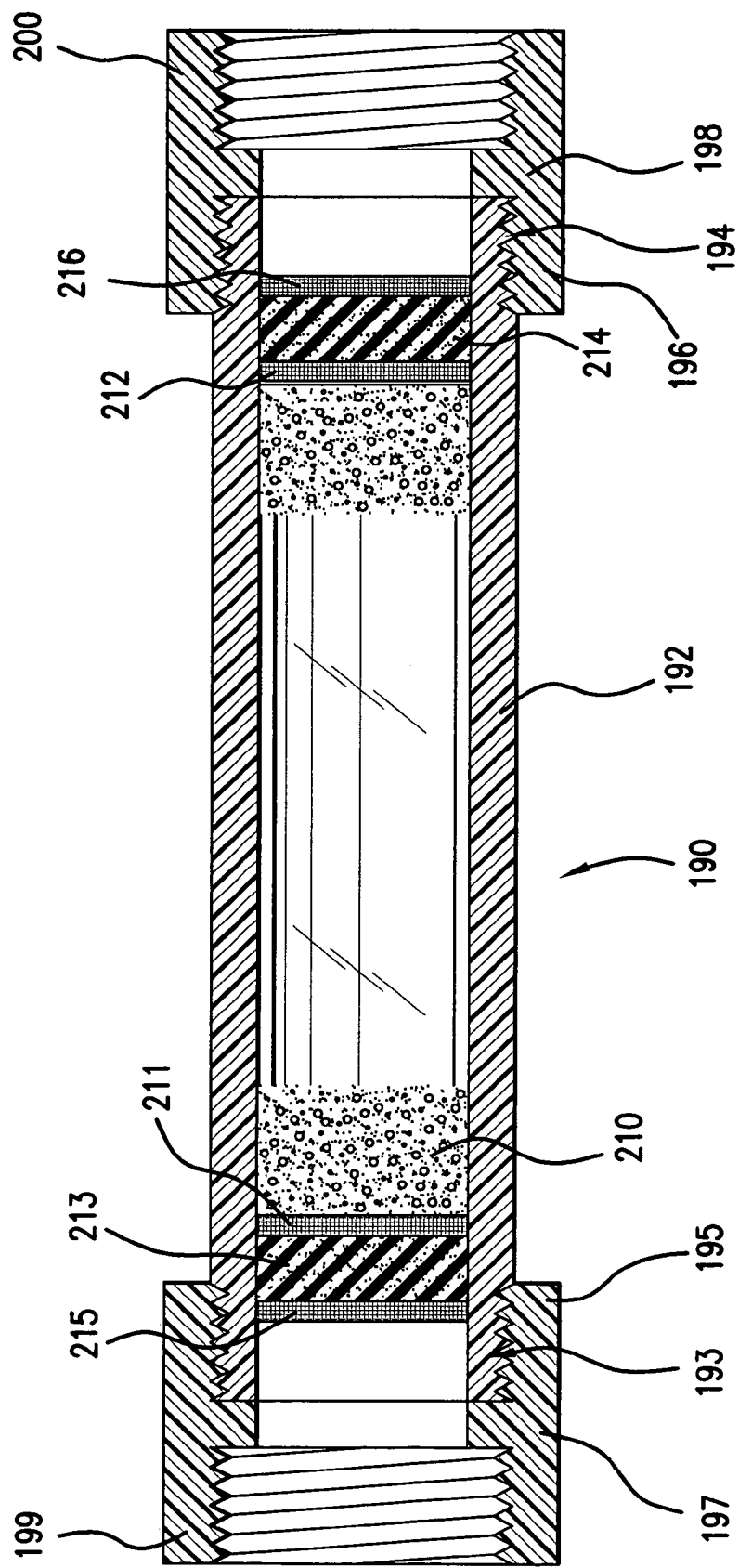
FIG. 6 is a longitudinal sectional view of a third corrosion inhibitor dispensing apparatus.

FIG. 6 shows an in-line cartridge 190 that lacks a housing body separate from a cartridge body 192. The body 192 has threaded end portions 193 and 194 for respectively engaging mating threaded portions 195 and 196 of fittings 197 and 198. The fittings have additional threaded portions 199 and 200 for engaging conduit lengths upstream and downstream. The particular fitting technology may be selected as appropriate for the application. The exemplary bodies are generally circular cylindrical tubes centrally containing corrosion inhibitor material 210. The material is immediately adjacently retained by foraminate members 211 and 212. In the exemplary embodiment, outboard of the members 200 and 212 are pH indicator bodies 213 and 214. The indicator bodies 213 and 214, themselves, are further retained by outboard foraminate members 215 and 216. In an exemplary implementation, the body 192 is transparent to facilitate viewing of the corrosion inhibitor material 210 and indicator material 213 and 214. Accordingly, the retaining members 215 and 216 are recessed slightly from adjacent rims of the body 192 which may be hidden within the associated fittings.

One or more embodiments of the present invention have been described. Nevertheless, it will be understood that various modifications may be made without departing from the spirit and scope of the invention. For example, when adapted to an existing system, details of the system may influence details of any particular implementation. Although illustrated examples involve a forced flow-through cartridge configuration, other configurations such as passive diffusion configurations are possible. Accordingly, other embodiments are within the scope of the following claims.

What is claimed is:

1. An apparatus comprising:
   a housing having a fluid inlet and a fluid outlet;
   a first body comprising a cathodic corrosion inhibitor within the housing; and
   a second body comprising an anodic corrosion inhibitor within the housing, wherein:
   the fluid inlet and fluid outlet are positioned on a secondary recirculating flowpath in communication with a main recirculating flowpath, the main recirculating flowpath being selected from the group consisting of machining coolant, hydraulic fluid, and heat exchanger circulation loops.

2. The apparatus of claim 1 wherein:
   the first body further comprises a metal complexing agent for increasing solubility of at least one of the anodic corrosion inhibitor and cathodic corrosion inhibitor.

3. The apparatus of claim 1 wherein:
   the first body is selected from the group consisting of powders, agglomerated powders, beads, fibers, perforated material, reticulated material, and their combinations; and
   the second body is selected from the group consisting of powders, agglomerated powders, beads, fibers, perforated material, reticulated material, and their combinations.

4. The apparatus of claim 1 wherein:
   the cathodic corrosion inhibitor consists essentially of cerous citrate; and
   the anodic corrosion inhibitor consists essentially of at least one of zinc molybdate and strontium tungstate.

5. The apparatus of claim 1 wherein:
   the cathodic corrosion inhibitor comprises cerous citrate; and
   the anodic corrosion inhibitor comprises at least one of zinc molybdate and strontium tungstate.

6. The apparatus of claim 1 wherein:
   the housing comprises a main housing and at least one cartridge body within the main housing, the at least one cartridge body, in turn, containing the first body and the second body.

7. The apparatus of claim 6 wherein the at least one cartridge body includes a first cartridge body and a second cartridge body in series.

8. The apparatus of claim 6 wherein the at least one cartridge body includes a first cartridge body and a second cartridge body in parallel.

9. The apparatus of claim 6 wherein:
   the at least one cartridge body includes a transparent portion; and
   the main housing includes a transparent portion or an aperture at least partially overlapping the cartridge body transparent portion.

10. The apparatus of claim 1 wherein the housing contains a first colorimetric chemical indicator between the fluid inlet and the first and second bodies; and
    the housing contains a second colorimetric chemical indicator between the fluid outlet and the first and second bodies.

11. The apparatus of claim 10 wherein the first indicator is in a first cartridge containing the first body; and the second indicator is in a second cartridge containing the second body.

12. A method comprising:
directing a flow of fluid to the inlet of the apparatus of claim 1 so as to cause the fluid to pass through the apparatus and exit the outlet, the passing depleting the cathodic corrosion inhibitor and anodic corrosion inhibitor;
responsive to depletion of at least one of the cathodic corrosion inhibitor and anodic corrosion inhibitor, interrupting the flow;
removing the body of said at least one; and
installing a replacement body.

13. The method of claim 12 wherein:
the first and second bodies are replaced.

14. An apparatus comprising:
a housing having a fluid inlet and a fluid outlet, the housing comprising:
   a main housing; and
   at least one cartridge body within the main housing, the at least one cartridge body including a first cartridge body and a second cartridge body in series;
a first body comprising a cathodic corrosion inhibitor within at least one cartridge body; and
a second body comprising an anodic corrosion inhibitor within the at least one cartridge body.

15. The apparatus of claim 14 wherein:
the first body is contained within the first cartridge body, not the second cartridge body; and
the second body is contained within the second cartridge body, not the first cartridge body.

16. An apparatus comprising:
a housing having a fluid inlet and a fluid outlet, the housing comprising:
   a main housing; and
   at least one cartridge body within the main housing, the at least one cartridge body including a first cartridge body and a second cartridge body in parallel;
a first body comprising a cathodic corrosion inhibitor within at least one cartridge body; and
a second body comprising an anodic corrosion inhibitor within the at least one cartridge body.

17. The apparatus of claim 16 wherein:
the first body is contained within the first cartridge body, not the second cartridge body; and
the second body is contained within the second cartridge body, not the first cartridge body.

18. An apparatus comprising:
a housing having a fluid inlet and a fluid outlet;
a first body comprising a cathodic corrosion inhibitor within the housing; and
a second body comprising an anodic corrosion inhibitor within the housing, wherein:
the housing comprises a main housing and at least one cartridge body within the main housing, the at least one cartridge body, in turn, containing the first body and the second body;
the at least one cartridge body includes a transparent portion; and
the main housing includes a transparent portion or an aperture at least partially overlapping the cartridge body transparent portion.

19. An apparatus comprising:
a housing having a fluid inlet and a fluid outlet;
a first body comprising a cathodic corrosion inhibitor within the housing; and
a second body comprising an anodic corrosion inhibitor within the housing, wherein:
the housing contains a first colorimetric chemical indicator between the fluid inlet and the first and second bodies; and
the housing contains a second calorimetric chemical indicator between the fluid outlet and the first and second bodies.

20. The apparatus of claim 19 wherein:
the first indicator is in a first cartridge containing the first body; and
the second indicator is in a second cartridge containing the second body.

21. The apparatus of claim 20 wherein:
the first cartridge has a transparent portion adjacent the first indicator; and
the second cartridge has a transparent portion adjacent the second indicator.

22. The apparatus of claim 19 wherein:
the cathodic corrosion inhibitor comprises cerous citrate; and
the anodic corrosion inhibitor comprises at least one of zinc molybdate and strontium tungstate.

23. The apparatus of claim 19 wherein:
the cathodic corrosion inhibitor consists essentially of cerous citrate; and
the anodic corrosion inhibitor consists essentially of at least one of zinc molybdate and strontium tungstate.

24. The apparatus of claim 19 wherein:
at least one of the first and second indicators is a pH indicator.

25. The apparatus of claim 19 wherein:
both of the first and second indicators are pH indicators.

\* \* \* \* \*

UNITED STATES PATENT AND TRADEMARK OFFICE
CERTIFICATE OF CORRECTION

PATENT NO.         : 7,399,389 B2
APPLICATION NO.    : 11/171765
DATED              : July 15, 2008
INVENTOR(S)        : Mark R. Jaworowski Page 1 of 1

It is certified that error appears in the above-identified patent and that said Letters Patent is hereby corrected as shown below:

In column 6, claim 19, line 21, delete "calorimetric" and insert --colorimetric--.

Signed and Sealed this

Fourth Day of November, 2008

JON W. DUDAS
*Director of the United States Patent and Trademark Office*